G. A. CHEBROU & S. A. LEMP.
ELECTRIC SWITCH.
APPLICATION FILED APR. 20, 1914.

1,196,662.

Patented Aug. 29, 1916.

UNITED STATES PATENT OFFICE.

GEORGES AUGUSTE CHEBROU AND SAMUEL ADOLPHE LEMP, OF PARIS, FRANCE.

ELECTRIC SWITCH.

1,196,662.　　　　　　　　Specification of Letters Patent.　　Patented Aug. 29, 1916.

Application filed April 20, 1914. Serial No. 833,284.

*To all whom it may concern:*

Be it known that we, GEORGES AUGUSTE CHEBROU and SAMUEL ADOLPHE LEMP, citizens of the French Republic, residing at 38 Rue Legendre, Paris, France, have invented certain new and useful Improvements in Electric Switches; and we do hereby declare the following to be a full, clear, and exact description of the invention, such as will enable others skilled in the art to which it appertains to make and use the same.

This invention relates to electric switches and refers to that type of such devices in which the contact is effected by means of a rocking dolly.

The principal feature of the invention resides in the fact that the sphere or the like constituting the lower end of the rocking dolly is cut away or truncated, such sphere or the like being located in a bearing provided in the upper part or end of a sleeve, an intermediate member being slidably fitted within the sleeve or guided thereby, upon which intermediate member the lower portion of the dolly rests, so that by rocking over the dolly out of its central position, in any direction, the intermediate member is pressed downward or slid within the sleeve and operates a contact spring which closes the electric circuit.

Figure 1:
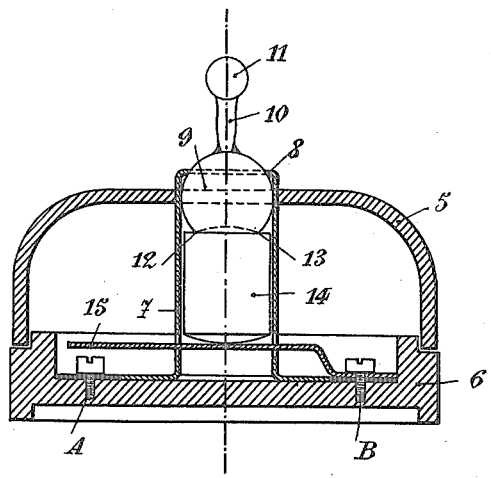
Figure 2:
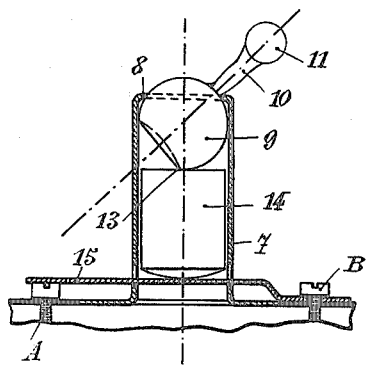

In the accompanying drawing—Figure 1 is a sectional elevation of a switch constructed according to this invention, in the open position of the contact spring, and Fig. 2 is a sectional elevation of a portion of the same switch in the position in which the circuit is closed.

Similar letters and numerals of reference refer to similar parts in both the views.

The switch made according to the invention comprises a china or other suitable base plate 6, to which is secured a casing 5, in any appropriate manner, for instance by screwing it on to the base plate 6 or on to the sleeve 7. The sleeve 7 is secured to the base plate 6 and bent inward at its upper end in order to provide a seating for the sphere 9. As will be seen from the drawing, the sphere 9 can be rotated in any direction, the rotation being only limited by the lever or handle 10 or the ball 11 of the rocking dolly coming against the end 8 of the sleeve 7. At Fig. 2 the lever 10 is seen in contact with the end 8 of the sleeve 7.

The sphere 9 has a truncated or cut away portion at its lower end, thus forming a circle passing through the points 12 and 13 Fig. 1. It will be seen that the distance of the different points on the cut away or truncated surface from the center of the sphere is smaller than the radius of the sphere, so that when the lever 10 is rocked over from its axial position into the inclined position, the intermediate member 14 which is slidably arranged in the sleeve 7 will be pressed downward and operate a contact spring 15. As soon as the lever 10 is brought back into its axial position the intermediate member 14 is again brought back to its initial position by the action of the contact spring 15.

The sleeve 7 is suitably slotted at diametrically opposite positions or on opposite sides to enable the spring 15 to pass through.

In the position shown in Fig. 2 the part 13 of the truncated spherical surface 9 is pressing on the intermediate member 14, thus maintaining the latter as also the contact spring 15 in the position for closing the circuit, the current passing when the parts are in such position through the terminal A, to the contact lever 15 and thence to the terminal B or vice versa.

The invention may be applied with advantage to all classes of electrical contact devices, such for instance as ordinary switches, throw over switches, and other similar apparatus.

One of the principal advantages of the device made according to the invention is that the sphere 9 can rotate freely, and is not fixed on an eccentric axle, so that the fitting together of the device is much more simple and its manufacture consequently much less costly than with devices of this description as hitherto constructed.

What we claim as our invention and desire to secure by Letters Patent of the United States of America is:—

1. An electrical switch of the class described comprising in combination a base plate, a circular sleeve mounted on said base plate, a truncated spherical member located within the end of said sleeve, retained therein by suitable means, and in such a way that the said truncated spherical member can be rocked in any direction, means for rocking the said member, an intermediate -member slidable with respect to the sleeve, contacting with the truncated spherical member and adapted to be operated by such member, and a contact device adapted to be closed by the sliding of the intermediate member substantially as described.

2. An electrical switch of the class described comprising in combination a base plate, a circular sleeve mounted on said base plate, a truncated spherical member located within the end of said sleeve, and retained therein by flanging over inward the end of the sleeve, in such a way that the said truncated spherical member can be rocked in any direction, means for rocking the said member, an intermediate member slidable with respect to the sleeve, contacting with the truncated spherical member and adapted to be operated by such member, and a contact device adapted to be closed by the sliding of the intermediate member substantially as described.

3. An electrical switch of the class described comprising in combination a base plate, a circular sleeve mounted on said base plate, a truncated spherical member located within the end of said sleeve, and retained therein by flanging over inward the end of the sleeve, in such a way that the said truncated spherical member can be rocked in any direction, a handle for rocking said member, an intermediate member sliding within the sleeve, a contact spring passing through suitable apertures in the sleeve and adapted when the intermediate member is operated to complete the electrical circuit substantially as described.

In testimony whereof we affix our signatures in presence of two witnesses.

GEORGES AUGUSTE CHEBROU.
SAMUEL ADOLPHE LEMP.

Witnesses:
CHRIS. P. PUNBY,
GEORGE E. LIGHT.